April 5, 1955  R. N. REINHARD  2,705,462
MACHINE FOR MAKING COATED FROZEN CONFECTION BALLS
Filed June 2, 1953  2 Sheets-Sheet 1
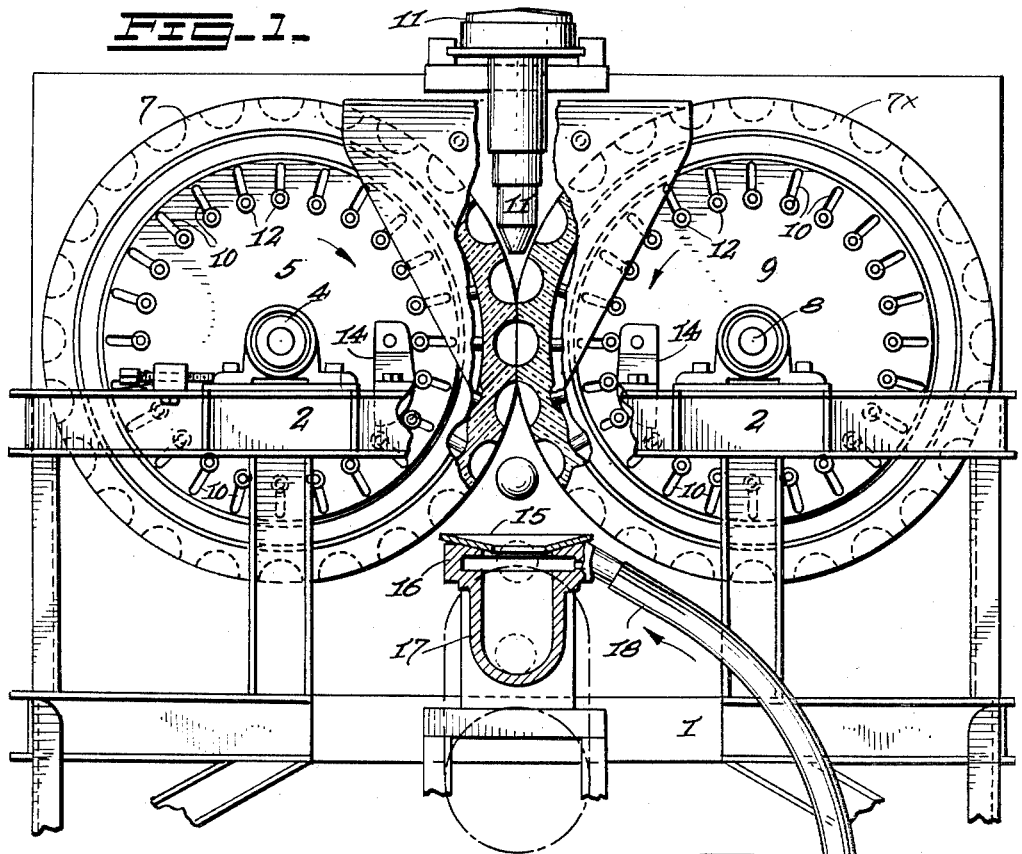
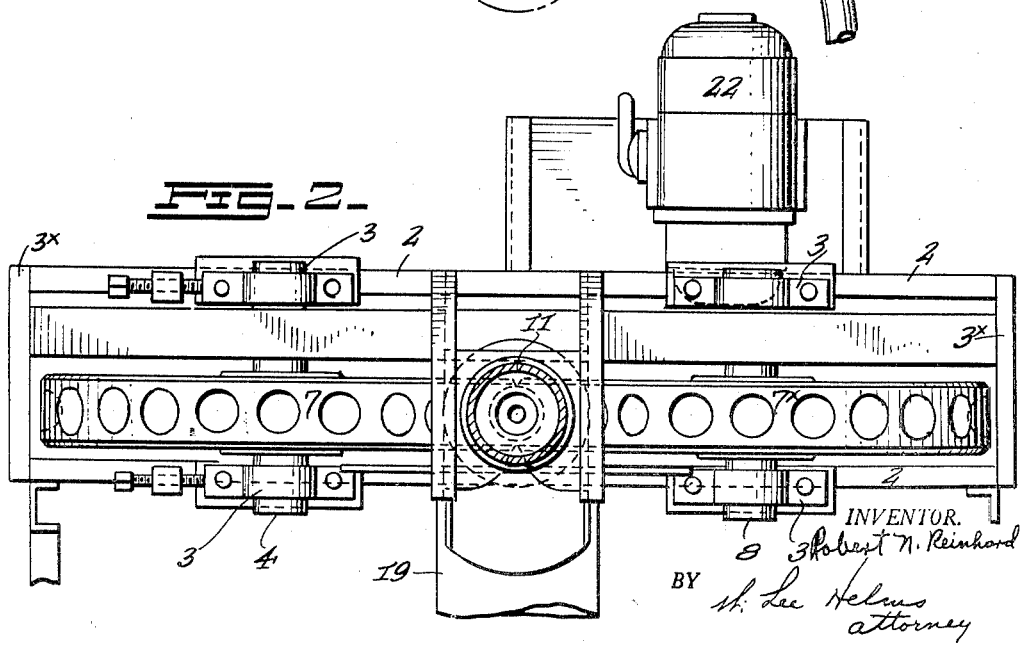
INVENTOR.
Robert N. Reinhard
BY H. Lee Helms
attorney April 5, 1955 R. N. REINHARD 2,705,462
MACHINE FOR MAKING COATED FROZEN CONFECTION BALLS
Filed June 2, 1953 2 Sheets-Sheet 2
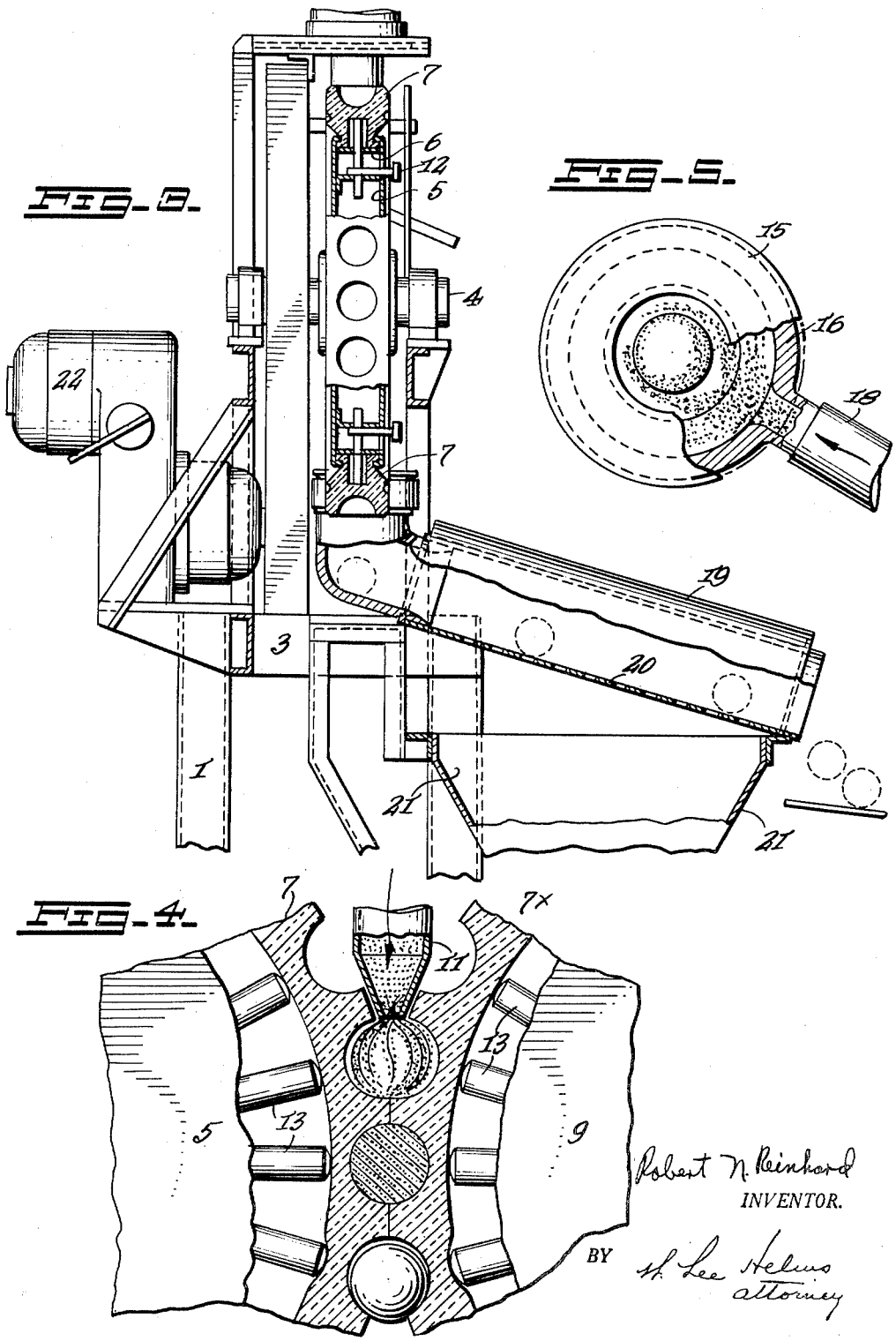

United States Patent Office 2,705,462
Patented Apr. 5, 1955

2,705,462

MACHINE FOR MAKING COATED FROZEN CONFECTION BALLS

Robert N. Reinhard, Glendale, Calif., assignor to Foremost Dairies, Inc., New York, N. Y., a corporation of New York Application June 2, 1953, Serial No. 359,118

5 Claims. (Cl. 107—1)

The object of the present invention is to provide a simple, inexpensive and rapidly operating machine for making what may be aptly termed "snowball" ice cream and allied products. The machine also incorporates co-acting means for coating the discharged frozen confection balls with a suitable coating material as for example, shredded coconut.

The invention will be described with reference to the accompanying drawings, in which Fig. 1 is a view in elevation showing an embodiment, the forming wheels being partly broken away together with said elements of the coating means.

Fig. 2 is a top plan view partly broken away.

Fig. 3 is a view in elevation partly broken away.

Fig. 4 is an enlarged detailed vertical section at the peripheral portions of the meeting molding wheels.

Fig. 5 is a top plan view, partly broken away, to illustrate the form and action of the primary coating elements.

Referring to the drawings it will be seen that mounted upon a framework generally indicated at 1 are spaced circular supports 2, connected by frame members 3, Fig. 2. Two sets of opposed bearing brackets 3 are provided, these being bolted down upon the horizontal supports 2. The first set of bearing brackets receives a shaft 4 upon which is mounted a molding wheel 5, preferably constructed of spaced aluminum discs with suitable connecting rings, the outermost disc being formed near its periphery with a plurality of radial slots for a purpose hereinafter described.

The discs of the wheel are spaced and connected by an outermost ring 6, Fig. 3, upon which is seated a molded soft pliable rubber annulus hereinafter termed the "molding ring" and as shown at 7.

The molding ring 7 is formed with circumferential pockets which, in the present embodiment, are half the form that is to be molded, the form shown being ball-shaped.

The second set of bracket bearings 3 receives a shaft 8 upon which is mounted a molding wheel 9 of the same construction as wheel 5, the annulus disc of which is formed near its periphery with radial slots, the radial slots as to each wheel being indicated at 10. Wheel 9 carries soft pliable rubber molding ring 7X having complementary pockets.

The wheels are so positioned and rotated that they run together under mutual pressure so that each of the successive mold cavities is closed and sealed off directly in line with the axis of the two wheels. In other words the rubber compresses to such an extent that there is a straight line through the center of each of these successive molds as the wheels revolve, and such molds then are opened up allowing formed pieces to become free and fall.

As shown in Fig. 1 ice cream or the like which will be frozen to a substantially form-retaining degree, may be taken directly from a continuous freezer and led to a nozzle 11. By synchronizing the production and flow of ice cream to the nozzle with the speed of the molding wheels, each mold can be filled to capacity without having any excess. Referring to Fig. 1, it will be seen that the nozzle is so positioned that as each two mold cavities are brought together at their bottoms (with respect to Fig. 1), the outward end of the nozzle will lie in communication with the thus provided partially closed mold cavity. The flow of ice cream or the like continues as the mold cavities are brought together until the mold is filled completely and it reaches a position meeting a horizontal line extending through the axis of each molding wheel. The compressed material, formed into a ball, is released in the manner shown in Fig. 1 and the formed ball drops by gravity.

As a precaution to insure that the molded pieces are dislodged from the mold cavities, there is disposed in each radial wheel disc slot a push rod preferably having a roller or rounded member at its end. The push rods are indicated at 12 in the drawings. Each push rod 12 carries a finger 13 and the push rods are lined with the centers of the mold cavities as shown more particularly in Fig. 4.

The roller or otherwise rounded ends of the push rods successively meet cam members 14 and as the mold cavities open, appropriate push rods are moved inwardly and the walls of the mold cavities are likewise moved from the inside to make sure that the pieces become dislodged.

The discharged balls or other shaped pieces fall downwardly to an opening in a dished cover plate 15, at the top of a coating box which is preferably formed as shown in Figs. 1 and 5. Surrounding the opening of member 15 is the head 16 of a coating box 17, the head having an internal ring shaped cavity communicating with a feed tube 18. From a suitable source and under air pressure, coating material, as for example, ground coconut, is forced into tube 18, and striking the annular walls of the ring shaped cavity maintains a bath of closely associated coating particles through which bath the succession of molded balls will pass.

As shown in Fig. 5 the molding box discharged into a collection member or trough 19 having a perforated bottom at 20, the latter communicating with an underlying reservoir or collecting chamber 21 for the discharged excess coating material. It will be understood that this excessive material may be continuously brought by vacuum to the blower which feeds the coating material into tube 18 and thence to the coating head 16.

It will be understood that the molding wheels are driven in the direction of the arrows in Fig. 1 by any suitable means and at controlled speeds. Thus the motor 22 shown in Fig. 2 may have a chain or gear connection with shaft 8 for one of the molding wheels and the latter may be driven by friction from the second wheel or by a suitable drive connection with the motor.

It will be understood that various modifications may be made in the form and in the arrangement of the elements constituting the embodiment illustrated in the drawings without departing from the spirit of the invention.

By the use of the rubber or rubber-like somewhat elastic molding rings the balls may be dislodged from opposed complementary mold cavities as they were moved away from each other by forming the cavities in a somewhat distorted shape, this distortion being entirely cured by movement of the cavities into true form through pressure contact of the molding rings. Thus when this pressure contact is released the walls of the cavities will have a force tending to move them back into initial position and hence the movement will tend to be away from the molded unit. Therefore, the use of the dislodging means shown in the drawing, while convenient, is not essential. For example, the cavities in the molding ring may have a predetermined initial depth which is reduced by the compression of the rubber-like material as to complementary cavities, when the molding rings are brought together, this reduction, bringing the cavities into a final desired form. When the mold formed by the abutting complementary cavity walls is broken in the continued movement of the walls the rubber-like material will tend to move away from the molded unit at predetermined areas and hence the unit will be released.

It will also be understood that while a yielding and somewhat elastic cavity ring is preferred, a rigid or semi-rigid material may be used, particularly in conjunction with molded unit releasing means such as provided by the pins and cam operated fingers above described and shown in the drawings.

Having described my invention, what I claim and desire to secure by the issue of Letters Patent, is as follows:

1. A machine for making frozen confection units which consists in at least two wheels positioned for abutment and each carrying at its periphery a resilient tire having a plurality of molding cavities, the cavities of one wheel complementing cavities of the second wheel so that as opposed cavities of the two wheels are brought into full abutment a mold is completed, and as lower ends of two complementary cavities of the wheels meet a partially opened mold cavity is provided, a filling nozzle positioned between peripheral areas of the two wheels and adapted to discharge into successive partially open molds each formed by the meeting of opposed complementary cavities at their lower ends, means for distorting the resilient walls of the cavities for release of the frozen confection units, and means for rotating the wheels.

2. A machine for making frozen confection units which consists in at least two wheels positioned for abutment each carrying a periphery of resilient material having a plurality of molding cavities, the cavities of one wheel complementing cavities of the second wheel so that as opposed cavities of the two wheels are brought into full abutment a mold is completed, and as lower ends of two complementary cavities of the wheels meet a partially opened mold cavity is provided, a filling nozzle positioned between peripheral areas of the two wheels and adapted to discharge into successive partially open molds each formed by the meeting of opposed complementary cavities at their lower ends, means for rotating the wheels and means acting upon at least one area of each mold cavity for distorting the same and thereby dislodging the contents thereof.

3. A machine for making plastic units which consists in at least two wheels having resilient rims positioned for yielding abutment and each carrying at its periphery a plurality of molding cavities, the cavities of one wheel complementing cavities of the second wheel so that as opposed cavities of the two wheels are brought into full abutment a mold is completed, and as lower ends of two complementary cavities of the wheels meet a partially opened mold cavity is provided, a filling nozzle positioned between peripheral areas of the two wheels and adapted to discharge into successive partially open molds each formed by the meeting of opposed complementary cavities at their lower ends, means for rotating the wheels and means acting upon at least one area of each mold cavity for dislodging the contents thereof, said dislodging means consisting of a plurality of plungers leading to the outer face of the resilient wall of each mold cavity, fingers exterior the wheels and cam members adapted to successively project the fingers in the rotation of the wheels.

4. A machine for making plastic units which consists in at least two wheels having pliable rims positioned for abutment and each carrying at its periphery a plurality of molding cavities, the cavities of one wheel complementing cavities of the second wheel so that as opposed cavities of the two wheels are brought into full abutment a mold is completed and as lower ends of two complementary cavities of the wheels meet a partially opened mold cavity is provided, a filling nozzle positioned between peripheral areas of the two wheels and adapted to discharge into successive partially open molds each formed by the meeting of opposed complementary cavities at their lower ends, and collection and coating means for the discharged balls consisting of an apertured head, a blower tube for granular material communicating with said head, a suction-blower, a collection trough for said granular material and communicating with the said suction-blower and a perforated chute receiving the formed balls in succession and discharging excess granular material through its perforations and into a collection chamber.

5. A machine for making frozen confection units constructed in accordance with claim 1 in which the cavities of the wheels are formed in elastic rubber-like wheel peripheral rings, the rubber-like cavity rings of the wheels being brought into pressure engagement with each other.

References Cited in the file of this patent

UNITED STATES PATENTS

| | | |
|---|---|---|
| 9,455 | Pond | Dec. 7, 1852 |
| 12,960 | Pond | May 29, 1855 |
| 379,068 | Heller et al. | Mar 6, 1888 |
| 940,959 | Elsworth et al. | Nov. 23, 1909 |
| 1,108,461 | Michitsch | Aug. 25, 1914 |
| 1,970,396 | Scherer | Aug. 14, 1934 |